United States Patent [19]

Winter et al.

[11] Patent Number: 5,539,066
[45] Date of Patent: Jul. 23, 1996

[54] PROCESS FOR THE PREPARATION OF SYNDIOTACTIC POLYOLEFINS HAVING A BROAD MOLECULAR WEIGHT DISTRIBUTION

[75] Inventors: Andreas Winter, Glashütten; Volker Dolle, Kelkheim am Taunus; Walter Spaleck, Liederbach, all of Germany

[73] Assignee: Hoechst Aktiengesellschaft, Germany

[21] Appl. No.: 326,083

[22] Filed: Dec. 22, 1994

Related U.S. Application Data

[63] Continuation of Ser. No. 102,698, Aug. 5, 1993, abandoned, which is a continuation of Ser. No. 888,559, May 22, 1992, abandoned.

[30] Foreign Application Priority Data

May 27, 1991 [DE] Germany .................. 41 17 260.4

[51] Int. Cl.$^6$ .................. C08F 4/42; C08F 2/06; C08F 2/18; C08F 2/34
[52] U.S. Cl. .................. 526/119; 526/118; 526/127; 526/160; 526/943; 526/351; 502/152
[58] Field of Search .................. 526/118, 119, 526/127, 160, 943

[56] References Cited

U.S. PATENT DOCUMENTS

| | | | |
|---|---|---|---|
| 4,849,487 | 7/1989 | Kaminsky et al. | 526/160 |
| 4,892,851 | 1/1990 | Ewen et al. | 526/160 |
| 4,975,403 | 12/1990 | Ewen | 526/160 |

FOREIGN PATENT DOCUMENTS

| | | |
|---|---|---|
| 0128045 | 12/1984 | European Pat. Off. . |
| 0128046 | 12/1984 | European Pat. Off. . |
| 0302424 | 2/1989 | European Pat. Off. . |
| 0310734 | 4/1989 | European Pat. Off. . |
| 0355439 | 2/1990 | European Pat. Off. . |
| 0387691 | 9/1990 | European Pat. Off. . |
| 3640924 | 6/1988 | Germany . |
| 89/5770 | 4/1990 | South Africa . |
| 88/5769 | 4/1990 | South Africa . |
| 901845 | 11/1990 | South Africa . |

OTHER PUBLICATIONS

Ewen et al, "Syndiotactic Propylene Polymerization with Group 4 Metallocene" J. Am. Chem. Soc. 1988 pp. 6255–6256.

Keii et al "Catalytic Olefin Polymerization" International Symposium on Recent Developments in Olefin Polymerization Catalyst, 1989, pp. 501–515.

Giannetti, E., et al, *J. of Polymer Science: Polymer Chem. Ed.* 23:2117–2134 (1985).

*Primary Examiner*—David W. Wu
*Attorney, Agent, or Firm*—Connolly & Hutz

[57] ABSTRACT

Syndiotactic polyolefins having a molecular weight distribution $M_w/M_n$ of $\geq 3$ and which may be monomodal, bimodal or multimodal are obtained by polymerization or copolymerization of olefins of the formula RCH=CHR, in which a catalyst system comprising an aluminoxane and a transition-metal component (metallocene) is used, the transition-metal component comprising at least 2 metallocenes of the formula

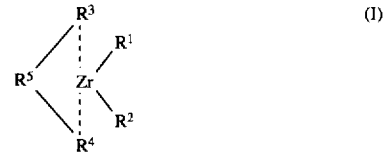

(I)

which are stereorigid and whose moiety formed by Zr and the substituents $R^1-R^4$ has $C_s$ symmetry or slightly distorted $C_s$ symmetry.

3 Claims, No Drawings

PROCESS FOR THE PREPARATION OF SYNDIOTACTIC POLYOLEFINS HAVING A BROAD MOLECULAR WEIGHT DISTRIBUTION

This application is a continuation of application Ser. No. 08/102,698, filed Aug. 5, 1993, now abandoned, which is a continuation of application Ser. No. 07/888,559, filed May 22, 1994, now abandoned.

DESCRIPTION

It is known that metallocene catalysts in combination with aluminoxanes as cocatalysts are capable of polymerizing olefins to give polyolefins having a narrow molecular weight distribution, $M_w/M_n$ of 2–3 (J. Polym. Sci., Pol. Chem. Ed. 23 (1985) 2117, EP-A 302 424).

Polyolefins of this type with a narrow distribution are suitable, for example, for applications in precision injection molding, injection molding in general and for the production of fibers. For numerous applications, such as, for example, thermoforming, extrusion, blow molding and for the production of polyolefin foams and films, broader or bimodal molecular weight distributions are required.

For polyethylene, it has been proposed to achieve such products by using two or more metallocene catalysts in the polymerization (EP-A 128 045). The systems described are achiral catalysts and would give atactic polypropylene on polymermization of propene. However, atactic polypropylene is unsuitable as a structural material.

The preparation of stereoblock polypropylene where $M_w/M_n$ is 13–15 is disclosed in DE-A 3 640 924. These catalyst systems are likewise unsuitable for the formation of polyolefins of high tacticity. Furthermore, the molecular weights which can be achieved at industrially relevant polymerization temperatures are too low.

EP-A 310 734 proposes polymerization systems comprising a mixture of a hafnocene and a zirconocene, both of which are chiral and stereorigid, for the preparation of highly isotactic polypropylene. The products obtained have broad to bimodal distributions where $M_w/M_n$ is from 3.7 to 10.3

If only a hafnocene catalyst is used, isotactic polypropylene with a broad distribution is obtained at a certain polymerization temperature, according to EP-A 355 439.

Syndiotactic polypropylene having a broad or bimodal distribution ($M_w/M_n>6.4$) is prepared in EP-A 387 691 using a hafnocene catalyst.

These processes have the disadvantages of hafnium catalyst costs which are too high for industrial applications, together with a low polymerization activity, which additionally makes it necessary to carry out thorough, high-cost purification of the prepared polymer to remove catalyst residues.

The object was thus to find a catalyst system and a process by means of which syndiotactic polyolefins having a broad to bimodal distribution can be prepared and which are suitable for industrial applications.

The object is achieved by using a catalyst system comprising at least two specific zirconocenes, which are stereorigid and prochiral, but are not necessary chiral, and which have $C_s$ symmetry or only slightly distorted $C_s$ symmetry, and an aluminum compound as cocatalyst.

The invention thus relates to a process for the preparation of a syndiotactic polyolefin which has a molecular weight distribution $M_w/M_n$ of $\geq 3.0$ and which may be monomodal, bimodal or multimodal, by polymerization or copolymerization of an olefin of the formula $R^aCH=CHR^b$ in which $R^a$ and $R^b$ are identical or different and are a hydrogen atom or alkyl radical having 1 to 14 carbon atoms, or $R^a$ and $R^b$ together with the atoms connecting them, can form a ring, at a temperature of from −60° to 200° C., at a pressure of from 0.5 to 100 bar, in solution, in suspension or in the gas phase, in the presence of a catalyst comprising a transition-metal component (metallocene) and an aluminoxane of the formula II

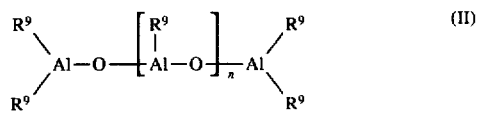

for the linear type and/or of the formula III

for the cyclic type, where, in the formulae II and III, the radicals $R^9$ may be identical or different and are a $C_1$–$C_6$-alkyl group, a $C_1$–$C_6$-fluoroalkyl group, a $C_6$–$C_{18}$-aryl group, a $C_6$–$C_{18}$-fluoroaryl group or a hydrogen, and n is an integer from 0 to 50, or, instead of the aluminoxane, comprises a mixture of an aluminoxane of the formula II and/or of the formula III with a compound $AlR^9{}_3$, which comprises using, as the transition-metal component, at least 2 metallocenes of the formula I

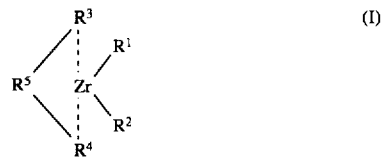

which are stereorigid and whose moiety formed by Zr and the substituents $R^1$–$R^4$ has $C_s$ symmetry or slightly distorted $C_s$ symmetry, and in which $R^1$ and $R^2$ are identical or different and are a hydrogen atom, a halogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group, $R^3$ and $R^4$ are different and are monocyclic or polycyclic hydrocarbon radicals which can form a sandwich structure together with the central atom Zr,

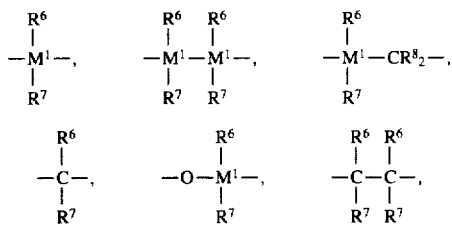

$=BR^6$, $=AlR^6$, —Ge—, —Sn—, —O—, —S—, $=SO$, $=SO_2$, $=NR^6$, $=CO$, $=PR^6$ or $=P(O)R^6$, where $R^6$, $R^7$ and $R^8$ are identical or different and are a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^6$ and $R^7$ or $R^6$ and $R^8$, together with the atoms connecting them, in each case form a ring, and $M^1$ is silicon, germanium or tin.

Alkyl here is straight-chain or branched alkyl and halogen is preferably fluorine or chlorine, in particular chlorine.

For the purposes of the present invention, the term $C_s$ symmetry means that the metallocenes I have a mirror plane in the Zr, $R^1$–$R^4$ moiety perpendicular to the plane passing through Zr, $R^1$ and $R^2$. The bisecting line of the angle $R^1$—Zr—$R^2$ extends in this mirror plane. In the case of slightly distorted $C_s$ symmetry, $R^1$ may be different from $R^2$ or the radicals $R^3$ and/or $R^4$ are substituted (such as, for example, methylcyclopentadienyl). Preferred metallocenes are those whose $C_s$ symmetry is not distorted.

It should be noted here that the term $C_s$ symmetry and its scope of meaning are determined by a formal (idealized) consideration of the metallocene molecule I. This means that shifts in said moiety, for example caused by the bridge $R^5$, which would arise in a complete structural determination (X-ray structural analysis) and could not be regarded as $C_s$-symmetrical if considered strictly, remain unconsidered for the purposes of the present invention.

The following also applies to the formula I:

$R^1$ and $R^2$ are identical or different and are a hydrogen atom, a $C_1$–$C_{10}$-, preferably $C_1$–$C_3$-alkyl group, a $C_1$–$C_{10}$-, preferably $C_1$–$C_3$-alkoxy group, a $C_6$–$C_{10}$-, preferably $C_6$–$C_8$-aryl group, a $C_6$–$C_{10}$-, preferably $C_6$–$C_8$-aryloxy group, a $C_2$–$C_{10}$-, preferably $C_2$–$C_4$-alkenyl group, a $C_7$–$C_{40}$-, preferably $C_7$–$C_{10}$-arylalkyl group, a $C_7$–$C_{40}$-, preferably $C_7$–$C_{12}$-alkylaryl group, a $C_8$–$C_{40}$-, preferably $C_8$–$C_{12}$-arylalkenyl group, or a halogen atom, preferably chlorine, $R^3$ and $R^4$ are different and are monocyclic or polycyclic hydrocarbon radicals which can form a sandwich structure together with the central atom Zr.

$R^3$ and $R^4$ are preferably fluorenyl and cyclopentadienyl, it being possible for the parent structures to carry additional substituents as defined for $R^6$.

$R^5$ is a single- or multimembered bridge which links the radicals $R^3$ and $R^4$ and is

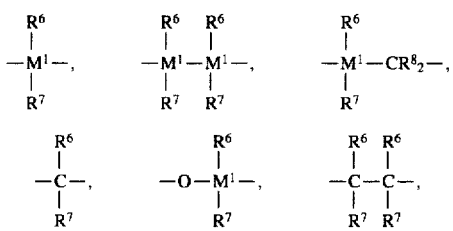

=$BR^6$, =$AlR^6$, —Ge—, —Sn—, —O—, —S—, =SO, =$SO_2$, =$NR^6$, =CO, =$PR^6$ or =$P(O)R^6$, where $R^6$, $R^7$ and $R^8$ are identical or different and are a hydrogen atom, a halogen atom; preferably chlorine, a $C_1$–$C_{10}$-, preferably $C_1$–$C_3$-alkyl group, in particular methyl group, a $C_1$–$C_{10}$-fluoroalkyl group, preferably $CF_3$ group, a $C_6$–$C_{10}$-fluoroaryl group, preferably pentafluorophenyl group, a $C_6$–$C_{10}$-, preferably $C_6$–$C_8$-aryl group, a $C_1$–$C_{10}$-, preferably $C_1$–$C_4$-alkoxy group, in particular methoxy group, a $C_2$–$C_{10}$-, preferably $C_2$–$C_4$-alkenyl group, a $C_7$–$C_{40}$-, preferably $C_7$–$C_{10}$-arylalkyl group, a $C_8$–$C_{40}$-, preferably $C_8$–$C_{12}$-arylalkenyl group, or a $C_7$–$C_{40}$-, preferably $C_7$–$C_{12}$-alkylaryl group, or $R^6$ and $R^7$ or $R^6$ and $R^8$, together with the atoms connecting them, in each case form a ring.

$M^1$ is silicon, germanium or tin, preferably silicon or germanium.

$R^5$ is preferably =$CR^6R^7$, =$SiR^6R^7$, =$GeR^6R^7$, —O—, —S—, =SO, =$PR^6$ or =$P(O)R^6$. The above-described metallocenes can be prepared by the general reaction scheme below:

$H_2R^3$ + butylLi ⟶ $HR^3Li$ $H_2R^4$ + butylLi ⟶ $HR^4Li$

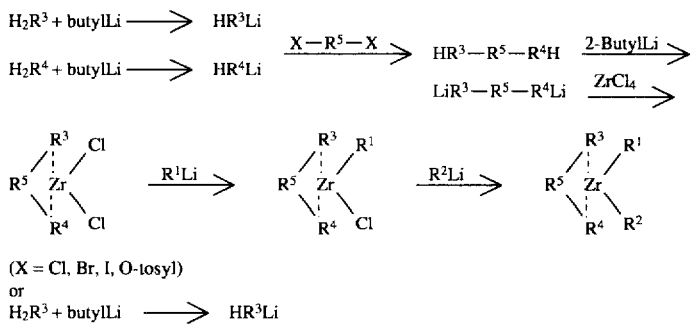

(X = Cl, Br, I, O-tosyl)
or
$H_2R^3$ + butylLi ⟶ $HR^3Li$

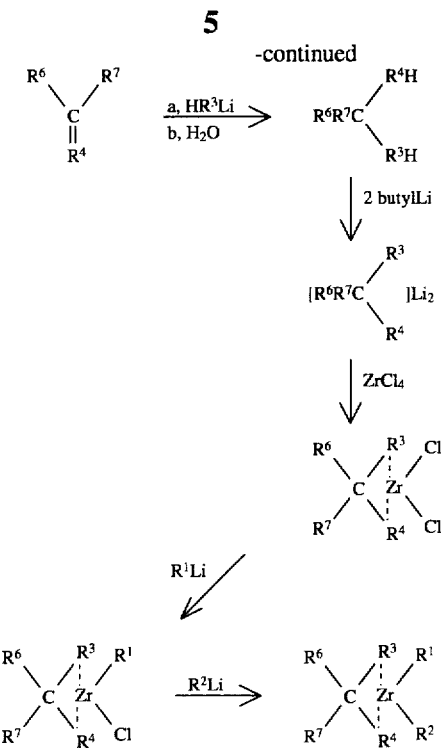

(cf. Journal of Organomet. Chem. (1985) 63–67 and EP-A 320 762).

The choice of the metallocenes for the polymerization of olefins to give polyolefins having a broad or multimodal distribution can take place by means of a test polymerization for each metallocene (cf. working examples). In this test, the olefin is polymerized to the polyolefin and the mean molecular weight $M_w$ thereof and the molecular weight distribution $M_w/M_n$ thereof are determined by means of gel permeation chromatography. Depending on the desired molecular weight distribution, the metallocenes are then combined. Taking into account the polymerization activities, it is then possible, for example by means of computer simulation of the combined gel permeation curves, to directly produce any desired molecular weight distribution via the type of metallocenes and via the ratio of the amounts of the metallocenes to one another.

The number of metallocenes I to be used according to the invention is preferably 2 or 3, in particular 2. However, it is also possible to use a greater number (such as, for example, 4 or 5).

By including the polymerization activities and molecular weights at various polymerization temperatures, in the presence of hydrogen as molecular weight regulator or in the presence of comonomers, the computer simulation model can be further refined and the applicability of the process according to the invention further improved.

Preferred metallocenes are (arylalkylidene) (9-fluorenyl) (cyclopentadienyl)zirconium dichloride, (diarylmethylene) (9-fluorenyl) (cylcopentadienyl)zirconium dichloride and (dialkylmethylene) (9-fluorenyl)-(cyclopentadienyl)zirconium dichloride.

Particular preference is given to (methyl(phenyl)methylene)(9-fluorenyl)(cyclopentadienyl)zirconium dichloride, (diphenylmethylene)(9-fluorenyl)(cyclopentadienyl)zirconiumdichloride and (dimethylmethylene)(9-fluorenyl)(cyclopentadienyl)zirconium dichloride.

The cocatalyst used is an aluminoxane of the formula II and/or III, where n is an integer from 0 to 50, preferably 10 to 35.

The radicals $R^9$ are preferably identical and are methyl, isobutyl, phenyl or benzyl, particularly preferably methyl.

If the radicals $R^9$ are different, they are preferably methyl and hydrogen or alternatively methyl and isobutyl, hydrogen or isobutyl preferably being present to the extent of 0.01–40% (number of radicals $R^9$).

The aluminoxane can be replaced as cocatalyst by a mixture comprising aluminoxane and $AlR^9{}_3$. The aluminoxane can be prepared in various ways by known processes. One of the methods is, for example, to react an aluminum hydrocarbon compound and/or a hydridoaluminum hydrocarbon compound with water (gaseous, solid, liquid or bound—for example as water of crystallization) in an inert solvent (such as, for example, toluene). To prepare an aluminoxane containing different alkyl groups $R^9$, two different trialkylaluminum compounds ($AlR_3+AlR'_3$), corresponding to the desired composition, are reacted with water (cf. S. Pasynkiewicz, Polyhedron 9 (1990) 429 and EP-A 302 424).

The precise structure of the aluminoxanes II and III is unknown.

Irrespective of the preparation method, all aluminoxane solutions have in common a varying content of unreacted aluminum starting compound, which is in free form or as an adduct.

It is possible, before use in the polymerization reaction, to preactivate the metallocenes, in each case separately or together as a mixture, by means of an aluminoxane of the formula (II) and/or (III). This significantly increases the polymerization activity and improves the particle morphology.

The preactivation of the metallocenes is carried out in solution. The metallocenes are preferably dissolved, as solids, in a solution of the aluminoxane in an inert hydrocarbon. Suitable inert hydrocarbons are aliphatic or aromatic hydrocarbons. Toluene or a $C_6$–$C_{10}$-hydrocarbon is preferably used.

The concentration of the aluminoxane in the solution is in the range from about 1% by weight to the saturation limit, preferably from 5 to 30% by weight, in each case based on the total solution. The metallocenes can be employed in the same concentration, but are preferably employed in an amount of from $10^{-4}$–1 mole per mole of aluminoxane. The preactivation time is from 5 minutes to 60 hours, preferably from 5 to 60 minutes. The temperature used is from −78° C. to 100° C., preferably from 0° to 70° C.

The metallocenes may also be prepolymerized or applied to a support. Prepolymerization is preferably carried out using the (or one of the) olefin(s) employed in the polymerization.

Examples of suitable supports are silica gels, aluminum oxides, solid aluminoxane or other inorganic support materials. Another suitable support material is a polyolefin powder in finely divided form.

A further possible embodiment of the process according to the invention comprises using a salt-like compound of the formula $R_xNH_{4-x}BR'_4$ or of the formula $R_3PHBR'_4$ as cocatalyst in place of or in addition to an aluminoxane. In these formulae, x=1, 2 or 3, R=alkyl or aryl, identical or different, and R'=aryl, which may also be fluorinated or partially fluorinated. In this case, the catalyst comprises the product of the reaction of the metallocenes with one of said compounds (cf. EP-A 277 004).

In order to remove the catalyst poisons present in the olefin, purification by means of an alkylaluminum compound, for example $AlMe_3$ or $AlEt_3$, is advantageous. This purification can be carried out either in the polymerization system itself, or the olefin is brought into contact with the Al compound before addition to the polymerization system and is subsequently removed again.

The polymerization or copolymerization is carried out in a known manner in solution, in suspension or in the gas phase, continuously or batchwise, in one or more steps, at a temperature of from −60° to 200° C., preferably from 20° to 80° C. Olefins of the formula $R^a$—CH=CH—$R^b$ are polymerized or copolymerized. In this formula $R^a$ and $R^b$ are identical or different and are hydrogen atoms or alkyl radicals having 1 to 14 carbon atoms. However, $R^a$ and $R^b$ may also form a ring with the carbon atoms connecting them. Examples of such olefins are ethylene, propylene, 1-butene, 1-hexene, 4-methyl-1-pentene, 1-octene, norbornene and norbornadiene. In particular, propylene and ethylene are polymerized.

If necessary, hydrogen is added as molecular weight regulator.

The overall pressure in the polymerization system is from 0.5 to 100 bar. The polymerization is preferably carried out in the industrially particularly interesting pressure range of from 5 to 64 bar.

The metallocenes are used in a concentration, based on the transition metal, of from $10^{-3}$ to $10^{-8}$ mol, preferably from $10^{-4}$ to $10^{-7}$ mol, of transition metal per $dm^3$ of solvent or per $dm^3$ of reactor volume. The aluminoxane or the aluminoxane/$AlR^9_3$ mixture is used in a concentration of from $10^{-5}$ to $10^{-1}$ mol, preferably from $10^{-4}$ to $10^{-2}$ mol, per $dm^3$ of solvent or per $dm^3$ of reactor volume. In principle, however, higher concentrations are also possible.

If the polymerization is carried out as a suspension or solution polymerization, an inert solvent which is customary for the Ziegler low-pressure process is used. For example, the polymerization is carried out in an aliphatic or cycloaliphatic hydrocarbon; the examples of these which may be mentioned are butane, pentane, hexane, heptane, decane, isooctane, cyclohexane and methylcyclohexane. It is also possible to use a gasoline or hydrogenated diesel oil fraction. Toluene can also be used. The polymerization is preferably carried out in the liquid monomer.

If inert solvents are used, the monomers are metered in in gaseous or liquid form.

The polymerization can take as long as desired, since the catalyst system used according to the invention only exhibits a slight decrease in the polymerization activity with time.

The process according to the invention is distinguished by the fact that the metallocenes described give polymers having a broad, bimodal or multimodal molecular weight distribution, high molecular weight, high syndiotacticity and good particle morphology in the industrially interesting temperature range between 20° and 80° C. with high polymerization activity.

The polymers according to the invention are particularly suitable for the production of films, in particular transparent films, thermoforming applications, polyolefin foams, extrusion applications and for the production of transparent hollow articles and for blow molding in general.

The examples below are intended to illustrate the invention in greater detail.

The following abbreviations are used:

| | | |
|---|---|---|
| VN | = | viscosity number in $cm^3/g$ |
| $M_w$ | = | weight average molecular weight in g/mol |
| $M_n$ | = | number average molecular weight in g/mol |
| $M_w/M_n$ | = | molecular weight dispersity | determined by gel permeation chromatography (= molecular weight distribution)

| | | |
|---|---|---|
| SI | = | syndiotactic index ($SIrr + 1/2\ mr$) determined by $^{13}$C-NMR spectroscopy |
| $n_{syn}$ | = | syndiotactic block length |
| MFI (230/5) | = | melt flow index, measured in accordance with DIN 53735; in g/10 min. |

A. Preparation of suitable metallocenes

All the working operations given below in the synthesis of metallocenes were carried out under a protective gas using absolute solvents.

EXAMPLE 1

(Phenyl(methyl)methylene)(9-fluorenyl)(cyclopentadienyl)zirconium dichloride

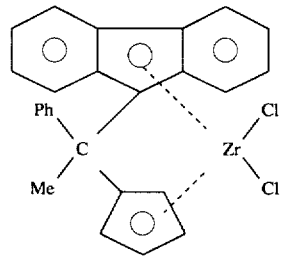

A solution of 67.8 mmol of fluorenyllithium in 50 $cm^3$ of THF was added at room temperature to a solution of 11.4 g (67.8 mmol) of 6-methyl-6-phenylfulvene in 40 $cm^3$ of THF. The mixture was stirred at room temperature for 2 hours, and 60 $cm^3$ of water were added. The substance which precipitated was filtered off with suction, washed with diethyl ether and dried in an oil-pump vacuum. 19.1 g (84.2%) of 2,2-cyclopentadienyl(9-fluorenyl)ethylbenzene (correct elemental analyses; $^1$H-NMR spectrum) were obtained.

10.0 g (29.9 mmol) of the compound were dissolved in 60 cm$^3$ of THF, and 26 cm$^3$ (65 mmol) of a 2.5 molar hexane solution of n-butyllithium were added at 0° C. After the mixture had been stirred for 15 minutes, the solvent was stripped off in vacuo. The dark red residue which remained was washed several times with hexane and dried in an oil-vacuum. 15.6 g of the red dilithio salt were obtained as the THF adduct; it contained about 30% of THF.

14.9 mmol of the dilithio salt were added at −78° C. to a suspension of 3.48 g (14.9 mmol) of ZrCl$_4$ in 70 cm$^3$ of CH$_2$Cl$_2$. After the batch had been slowly warmed to room temperature, it was stirred at room temperature for a further hour and filtered through a G4 frit; the residue was washed several times with CH$_2$Cl$_2$. The red filtrate was evaporated to dryness and the orange-red residue was recrystallized from CH$_2$Cl$_2$. 1.8 g (25%) of methylphenylmethylene(cyclopentadienyl)(9-fluorenyl)zirconiumdichloride were obtained as a pink crystal powder. $^1$H-NMR spectrum (100 MHz, CDCl$_3$): 7.1–8.25 (m, Flu-H, Ph-H), 6.90 (m, Ph-H), 6.10–6.50 (m, Ph-H, Cp-H), 5.90, 5.75 (2×m, Cp-H), 2.55 (s, CH$_3$).

EXAMPLE 2

Diphenylmethylene(9-fluorenyl)(cyclopentadienyl)zirconium dichloride

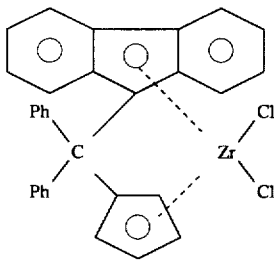

12.3 cm$^3$ (30.7 mmol) of a 2.5 molar hexane solution of n-butyllithium were added slowly at room temperature to a solution of 5.10 g (30.7 mmol) of fluorene in 60 cm$^3$ of THF. After 40 minutes, 7.07 g (30.7 mmol) of diphenylfulvene were added to the orange solution, and the mixture was stirred overnight. 60 cm$^3$ of water were added to the dark red solution, the solution becoming a yellow color, and the solution was extracted with ether. The ether phase was dried over MgSO$_4$, evaporated and left to crystallize at −35° C. 5.1 g (42%) of 1,1-cyclopentadienyl(9-fluorenyl)diphenylmethane were obtained as a beige powder.

6.4 cm$^3$ (10 mmol) of a 1.6 molar solution of butyllithium in hexane were added at 0° C. to 2.0 g (5.0 mmol) of the compound dissolved in 20 cm$^3$ of THF. The mixture was stirred at room temperature for 15 minutes, the solvent was stripped off, and the red residue was dried in an oil-pump vacuum and washed several times with hexane. After drying in an oil-pump vacuum, the red powder was added at −78° C. to a suspension of 1.16 g (6.00 mmol) of ZrCl$_4$. The batch was slowly warmed and then stirred at room temperature for 2 hours. The pink suspension was filtered through a G3 frit. The pink residue was washed with 20 cm$^3$ of CH$_2$Cl$_2$, dried in an oil-pump vacuum and extracted with 120 cm$^3$ of toluene. The solvent was stripped off and the residue was dried in an oil-pump vacuum, giving 0.55 g of the zirconium complex in the form of a pink crystal powder.

The orange-red filtrate from the reaction batch was evaporated and left to crystallize at −35° C. A further 0.45 g of the complex crystallized from CH$_2$Cl$_2$. Total yield 1.0 g (36%). Correct elemental analyses. The mass spectrum showed M$^*$=556. $^1$H-NMR spectrum (100 MHz, CDCl$_3$); 6.90–8.25 (m, 16, Flu-H, Ph-H), 6.40 (m, 2, Ph-H), 6.37 (t, 2, Cp-H), 5.80 (t, 2, Cp-H).

The metallocene dimethylmethylene(fluorenyl)(cyclopentadienyl)zirconium dichloride was prepared as described in the reference J. Am. Chem. Soc. 110 (1988) 6255.

In order to specifically prepare the desired molecular weight distribution $M_w/M_n$ (width of the molecular weight distribution, monomodal, bimodal or multimodal), the employed to this end in the combination must be known. To this end, at least one test polymerization is carried out for each of the possible metallocenes.

The examples below demonstrate, with reference to three suitable metallocenes, the procedure and the possible metallocene combinations for the preparation of the broad or multimodal molecular weight distribution according to the invention.

Test Polymerizations

EXAMPLE 3

A dry 16 dm$^3$ reactor was flushed with nitrogen and filled with 10 dm$^3$ of liquid propylene. 30 cm$^3$ of a toluene solution of methylaluminoxane (corresponding to 40 mmol of Al, mean degree of oligomerization of the methylaluminoxane n=20) were then added, and the batch was stirred at 30° C. for 15 minutes. In parallel, 11.9 mg (0.023 mmol) of diphenylmethylene(9-fluorenyl)(cyclopentadienyl)zirconium dichloride were dissolved in 15 cm$^3$ of a toluene solution of methylaluminoxane (20 mmol of Al). After 15 minutes, the solution was introduced into the reactor, and the polymerization temperature was increased to 60° C. After a polymerization time of 1 hour, the polymerization was terminated. 0.95 kg of polypropylene were obtained, corresponding to a metallocene activity of 79.8 kg of polypropylene/g of metallocene x h. VN=459 cm$^3$/g; $M_w$=547,000, $M_n$=188,000, $M_w/N_n$=2.9, SI=96.5%; n$_{syn}$=38.4; MFI 230/5=<0.1 g/10 min.

EXAMPLE 4

The procedure was analogous to Example 3, but 13.5 mg (0.027 mmol) of phenyl(methyl)methylene(9-fluorenyl)(cyclopentadienyl)zirconium dichloride were employed. 0.94 kg of polypropylene were obtained, corresponding to a metallocene activity of 69.5 kg of polypropylene/g of metallocene x h. VN=364 cm$^3$/g; $M_w$=490,000 g/mol; $M_w/M_n$= 2.6; SI=97.0%; n$_{syn}$=40.2; MFI (230/5)=0.25 g/10 min.

EXAMPLE 5

The procedure was analogous to Example 3, but 13.9 mg (0.032mmol) of dimethylmethylene(9-fluorenyl)(cyclopentadienyl)zirconium dichloride were employed. After a polymerization time of 2.5 hours, 2.56 kg of polypropylene were obtained, corresponding to a metallocene activity of 73.7 kg of polypropylene/g of metallocene x h. VN=125 cm$^3$/g; $M_w$=95250 g/mol; $M_w/M_n$=2.1; SI=94.6%; MFI (230/5)=55 g/10 min.

Examples 3 to 5 show that, for example by varying the radical $R^5$ in formula I

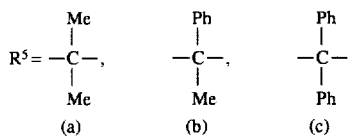

polymers of low (a), medium (b) and high (c) molecular weight can be prepared. Other modifications of the metallocene ligand sphere of the compounds of the formula I give comparable differences. The combinations according to the invention of such metallocenes give products having the broad or multimodal molecular weight distributions according to the invention and are described in greater detail in the examples below.

Preparation of polymers having a broad and/or bimodal molecular weight distribution

EXAMPLE 6

The procedure was analogous to Example 3, but the metallocene component was a mixture of 11.9 mg (0.023 mmol) of diphenylmethylene( 9-fluorenyl ) (cyclopentadienyl)-zirconium dichloride and 12.9 mg(0.030 mmol) of dimethylmethylene (9-fluorenyl) (cyclopentadienyl) zirconium dichloride in 15 cm³ of the toluene solution of methylaluminoxane. 2.05 kg of polypropylene, were obtained, corresponding to a metallocene mixture activity of 82.7 kg PP/g of metallocene mixture x h. VN=291 cm³/g; $M_w$=215,500 g/mol, $M_w/M_n$=5.0 bimodal; SI=96.1%.

EXAMPLE 7

Example 6 was repeated, but 11.9 mg (0.023 mmol) and 6.5 mg (0.015 mmol) of the metallocenes were used. 1.35 kg of polypropylene were obtained, corresponding to 73.0 kg of PP/g of metallocene mixture x h. VN=353 cm³/g; $M_w$=285,500 g/mol, $M_w/M_n$=5.4 bimodal; SI=96.8%.

EXAMPLE 8

Example 6 was repeated, but 6.0 mg (0.011 mmol) and 12.9 mg (0.030 mmol) of the metallocenes were used. 1.35 kg of polypropylene were obtained, corresponding to 71.4 kg of PP/g of metallocene mixture x h. VN=226 cm³/g; $M_w$=168,500 g/mol, $M_w/M_n$=4.7, bimodal; SI=96.0%.

EXAMPLE 9

Example 6 was repeated, but 20.0 mg (0.036 mmol) and 4.4 mg (0.010 mmol) of the metallocenes were used. 1.87 kg of polypropylene were obtained, corresponding to 76.6 kg of PP/g of metallocene mixture x h.

VN=423 cm³/g; $M_w$=327,000 g/mol, $M_w/M_n$=5.9, SI=96.6%.

EXAMPLE 10

Example 6 was repeated, but 4.0 mg (0.007 mmol) and 16.3 mg (0.038 mmol) of the metallocenes were used. 1.45 kg of polypropylene were obtained, corresponding to 71.4 kg of PP/g of metallocene mixture x h. VN=167 cm³/g; $M_w$=110,000 g/mol, $M_w/M_n$=4.0; VN=167 cm³/g; $M_w$=110,000 g/mol, $M_w/M_n$=4.0; SI=95.9%.

EXAMPLE 11

A dry 150 dm³ reactor was flushed with nitrogen and filled at 20° C. with 80 dm³ of a gasoline fraction with the aromatics removed and with a boiling range of 100°–120° C. The gas space was then flushed free from nitrogen by injecting 2 bar of propylene and releasing the pressure and repeating this cycle four times.

50 l of liquid propylene were added, and 320 cm³ of a toluene solution of methylaluminoxane (corresponding to 500 mmol of Al, molecular weight 1180 g/mol according to cryoscopic determination), and the reactor contents were heated to 40° C. Hydrogen was metered in to give a hydrogen content in the gas space of the reactor of 0.1% by volume, and this content was then maintained during the entire polymerization time by topping up (on-line gas chromatography). 19.1 mg (0.039 mmol) of phenyl(methyl)methylene(9-fluorenyl)(cyclopentadienyl)zirconium dichloride and 21.5 mg (0.039 mmol) of diphenylmethylene(9-fluorenyl)(cyclopentadienyl)zirconium dichloride were mixed, and the solid was dissolved in 96 ml of a toluene solution of methylaluminoxane (corresponding to 150 mmol of Al) and, after 15 minutes, the solution was introduced into the reactor. The polymerization system was kept at 40° C. for 5 hours by cooling. The polymerization was terminated by addition of 2 bar of $CO_2$ gas, and the polymer formed was separated from the suspension medium in a pressure filter. The product is dried for 24 hours at 80° C./200 mbar. 15.3 kg of polymer powder were obtained, corresponding to an activity of the metallocene mixture of 75.2 kg of PP/g of metallocene mixture x h. VN=523 cm³/g; $M_w$=368,000 g/mol; $M_w/M_n$=4.2 bimodal; SI=97.4%.

EXAMPLE 12

Example 11 was repeated, but 19.1 mg (0.039 mmol) and 1.0 mg (0.020 mmol) of the metallocenes were used and the polymerization temperature was 37° C. 9.7 kg of polymer powder were obtained, corresponding to an activity of 64.5 kg of PP/g of metallocene mixture x h. VN=428 cm³/g; $M_w$=326,000 g/mol; $M_w/M_n$=3.4; SI=97.2%.

EXAMPLE 13

Example 11 was repeated, but 6.0 mg (0.012 mmol) and 12.4 mg (0.022 mmol) of the metallocenes were used and the polymerization time was 7.5 hours. 9.5 kg of polymer powder were obtained, corresponding to an activity of 68.8 kg of PP/g of metallocene mixture x h. VN=618 cm³/g; $M_w$=457,000 g/mol; $M_w/M_n$=3.4 bimodal; SI=97.0%.

EXAMPLE 14

Example 11 was repeated, but 20.0 mg (0.040 mmol) and 4.8 mg (0.009 mmol) of the metallocenes were used. The polymerization temperature was 35° C. 8.85 kg of polymer powder were obtained, corresponding to an activity of 71.4 kg of PP/g of metallocene mixture x h. VN=321 cm³/g; $M_w$=223,500 g/mol; $M_w/M_n$=3.1; SI=96.5%.

EXAMPLE 15

Example 11 was repeated, but 7.9 mg (0.016 mmol) and 44.3 mg (0.080 mmol) of the metallocenes were used. No hydrogen was used, and the polymerization temperature was 44° C. 16.7 kg of polymer powder were obtained, corresponding to an activity of 63.9 kg of PP/g of metallocene mixture x h. VN=766 cm³/g; $M_w$=537,000 g/mol; $M_w/M_n$=3.4; SI=97.0%.

EXAMPLE 16

A dry 24 dm³ reactor was flushed with nitrogen and charged with 12 dm³ of liquid propylene and with 35 cm³ of a toluene solution of methylaluminoxane (corresponding to 52 of mmol Al, mean degree of oligomerization n=18). The contents were stirred at 30° C. for 30 minutes. In parallel, 6.0 mg (0.011 mmol) of diphenylmethylene(9-fluorenyl)(cyclopentadienyl)zirconiumdichloride, 5.0 mg (0.010 mmol) of phenyl(methyl)methylene(9-fluorenyl)(cyclopentadienyl) zirconiumdichloride and 6.0 mg (0.014 mmol) of dimethylmethylene(9-fluorenyl)(cyclopentadienyl)zirconium dichloride as a mixture of solids were dissolved in 13.5 cm³ of a toluene solution of methylaluminoxane (20 mmol of Al). After 30 minutes, the violet-red solution was introduced into the reactor, and the polymerization system was warmed to 60° C. over the course of 5 minutes by supply of heat and kept at this temperature for 2 hours.

The polymerization was terminated by addition of 1 mol of $CO_2$ gas. 2.3 kg of polymer product were obtained. The activity was thus 67.6 kg of PP/g of metallocene mixture x h. VN=272 cm³/g; $M_w$=212,500 g/mol; $M_w/M_n$=3.6; SI=96.8%.

EXAMPLE 17

Example 16 was repeated, but, in addition to propylene and methylaluminoxane solution, 10 dm³ (s.t.p.) of hydrogen and 100 g of ethylene were additionally metered into the reactor. The polymerization temperature was 50° C. Under these polymerization conditions, 2.10 kg of polymer product were obtained, corresponding to an activity of 61.8 kg of PP/g of metallocene mixture x h. VN=330 cm³/g; $M_w$=205,500 g/mol; $M_w/M_n$=3.9; 4.3% of ethylene content, SI=96.0%.

EXAMPLE 18

A dry 16 dm³ reactor was flushed with nitrogen and charged with 10 dm³ of liquid propylene and with 30 cm³ of a toluene solution of methylaluminoxane (corresponding to 40 mmol of Al mean degree of oligomerization of the methylaluminoxane was n=20). The contents were stirred at 30° C. for 10 minutes. In parallel, 8.3 mg (0.015 mmol) of diphenylmethylene(9-fluorenyl)(cyclopentadienyl)zirconium dichloride and 7.4 mg (0.015 mmol) of phenyl(methyl)methylene(9-fluorenyl)(cyclopentadienyl)zirconium dichloride were dissolved in 15 cm³ of a toluene solution of methylaluminoxane (20 mmol of Al), and the solution was metered into the reactor after 10 minutes. The polymerization temperature was kept at 45° C. for 6.5 hours. The polymerization was terminated by rapidly removing excess propylene in gas form. 1.95 kg of polymer product were obtained, and the polymerization activity was 19.1 kg of PP/g of metallocene mixture x h. VN=556 cm³/g; $M_w$=427,500 g/mol; $M_w/M_n$=3.9; SI=97.6%.

EXAMPLE 19

A dry 16 dm³ reactor was flushed with nitrogen and charged with 24 dm³ (s.t.p.) (corresponding to 1.5 bar) of hydrogen, 10 dm³ of liquid propylene and with 30 cm³ of a toluene solution of methylaluminoxane (corresponding to 40 mmol of Al, mean degree of oligomerization of the methylaluminoxane was n=20). The contents were stirred at 30° C. for 15 minutes. In parallel, 8.0 mg (0.014 mmol) of diphenylmethylene(9-fluorenyl)(cyclopentadienyl)zirconium dichloride and 8.0 mg (0.016 mmol) of phenyl(methyl)methylene(9-fluorenyl)(cylcopentadienyl)zirconium dichloride were dissolved in 7.5 cm³ of a toluene solution of methylaluminoxane (10 mmol of Al), and the solution was metered into the reactor after 15 minutes. The polymerization temperature was adjusted to 60° C. and kept at this temperature for 1 hour by cooling.

1.30 kg of polymer product were obtained, corresponding to an activity of 81.3 kg of PP/g of metallocene mixture x h. VN=169 cm³/g; $M_w$=116,800 g/mol; $M_w/M_n$=3.0; SI=96.8%.

EXAMPLE 20

The procedure was as in Example 19, but 40 dm³ (s.t.p.) (2.5 bar) of hydrogen were used and the metallocene mixture comprised 8.0 mg (0.014 mmol) of diphenylmethylene(9-fluorenyl)(cyclopentadienyl)zirconium dichloride and 9.0 mg (0.021 mmol) of dimethylmethylene(9-fluorenyl)(cyclopentadienyl)zirconium dichloride. The polymerization temperature was 70° C. 3.23 kg of polymer product were obtained, corresponding to an activity of 190.5 kg of PP/g of metallocene mixture x h. VN=105 cm³/g; $M_w$=68,600 g/mol; $M_w/M_n$=3.0; SI=96.0%.

EXAMPLE 21

The procedure was as in Example 20, but only 16 dm³ (s.t.p.) (1 bar) of hydrogen were used, and the polymerization temperature was 65° C. 2.54 kg of polymer product were obtained, corresponding to an activity of 149.4 kg of PP/g of metallocene mixture x h. VN=182 cm³/g; $M_w$=128,500 g/mol; $M_w/M_n$=3.4; SI=96.5%.

EXAMPLE 22

The procedure was as in Example 19, but only 16 dm³ (s.t.p.) (1 bar) of hydrogen were used. Instead of 30 cm³ of the toluene solution of methylaluminoxane, 20 mmol of trimethylaluminum (as a 20% strength by weight solution in toluene) were introduced into the reactor, and the polymerization temperature was 55° C. and the polymerization duration was 3 hours. 1.43 kg of polymer product were obtained, corresponding to an activity of 29.7 kg of PP/g of metallocene mixture x h. VN=184 cm³/g; $M_w$=130,500 g/mol; $M_w/M_n$=3.2; SI=97.1%.

We claim:

1. A process for the preparation of a syndiotactic polyolefin which has a molecular weight distribution $M_w/M_n$ of $\geq 3.0$ and which may be monomodal, bimodal or multimodal, by polymerization or copolymerization of an olefin of the formula $R^aCH=CHR^b$ in which $R^a$ and $R^b$ are identical or different and are a hydrogen atom or an alkyl radical having 1 to 14 carbon atoms, or $R^a$ and $R^b$, together with the atoms connecting them, can form a ring, at a temperature of from −60° to 200° C., at a pressure of from 0.5 to 100 bar, in solution, in suspension or in the gas phase, in the presence of a catalyst comprising a transition-metal component (metallocene) and an aluminoxane of the formula II

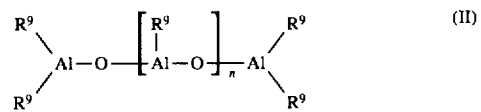

for the linear type and/or of the formula III

for the cyclic type, where, in the formulae II and III, the radicals $R^9$ may be identical or different and are a $C_1$–$C_6$-alkyl group, a $C_1$–$C_6$-fluoroalkyl group, a $C_6$–$C_{18}$ -aryl group, a $C_6$–$C_{18}$-fluoroaryl group or a hydrogen, and n is an integer from 0 to 50, or, instead of the aluminoxane, comprises a mixture of an aluminoxane of the formula II and/or of the formula III with a compound $AlR^9{}_3$, which comprise using, as the transition-metal component, at least 2 metallocenes, said metallocenes are (arylalkylidene)(9-fluorenyl)(cyclopentadienyl)zirconium dichloride, (diarylmethylene)(9-fluorenyl)(cyclopentadienyl)zirconium dichloride and/or (dialkylmethylene)(9-fluorenyl)(cyclopentadienyl)zirconium dichloride.

2. A process for the preparation of a syndiotactic polyolefin which has a molecular weight distribution $M_w/M_n$ of $\geq 3.0$ and which may be monomodal, bimodal or multimodal, by polymerization or copolymerization of an olefin of the formula $R^a CH{=}CHR^b$ in which $R^a$ and $R^b$ are identical or different and are a hydrogen atom or an alkyl radical having 1 to 14 carbon atoms, or $R^a$ and $R^b$, together with the atoms connecting them, can form a ring, at a temperature of from −60° to 200° C., at a pressure of from 0.5 to 100 bar, in solution, in suspension or in the gas phase, in the presence of a catalyst comprising a transition-metal component (metallocene) and an aluminoxane of the formula II

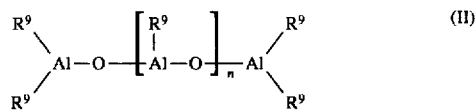

for the linear type and/or of the formula III

for the cyclic type, where, in the formulae II and III, the radicals $R^9$ may be identical or different and are a $C_1$–$C_6$-alkyl group, a $C_1$–$C_6$-fluoroalkyl group, a $C_6$–$C_{18}$ -aryl group, a $C_6$–$C_{18}$-fluoroaryl group or a hydrogen, and n is an integer from 0 to 50, or, instead of the aluminoxane, comprises a mixture of an aluminoxane of the formula II and/or of the formula III with a compound $AlR^9{}_3$, which comprise using, as the transition-metal component, at least 2 metallocenes, said metallocenes are (methyl(phenyl)methylene)(9-fluorenyl)(cylcopentadienyl)zirconium dichloride, (diphenylmethylene)(9-fluorenyl)(cyclopentadienyl)zirconium dichloride and/or (dimethylmethylene)(9-fluorenyl)(cyclopentadienyl)zirconium dichloride.

3. A polymerization process comprising employing a metallocene mixture of diphenylmethylene(9-fluorenyl)(cyclopentadienyl)-zirconium dichloride and dimethylmethylene(9-fluorenyl)(cyclopentadienyl)zirconium dichloride.

* * * * *

UNITED STATES PATENT AND TRADEMARK OFFICE
CERTIFICATE OF CORRECTION

PATENT NO. : 5,539,066
DATED : July 23, 1996
INVENTOR(S) : Winter, et. al.

It is certified that error appears in the above-indentified patent and that said Letters Patent is hereby corrected as shown below:

Column 2, lines 4 and 5 should read -- $R^a$ and $R^b$ are identical or different and are a hydrogen atom or an alkyl radical having 1 to 14 carbon atoms, or $R^a$ and $R^b$ --.

Column 2, line 50 should read -- $R^5$ is 
$$-\underset{\underset{R^7}{|}}{\overset{\overset{R^6}{|}}{M^1}}-,\quad -\underset{\underset{R^7}{|}}{\overset{\overset{R^6}{|}}{M^1}}-\underset{\underset{R^7}{|}}{\overset{\overset{R^6}{|}}{M^1}}-,\quad -\underset{\underset{R^7}{|}}{\overset{\overset{R^6}{|}}{M^1}}-CR^8_2-,$$

Column 11, line 66, delete "$M_w = 110,000$ g/mol, $M_w/M_n = 4.0$; VN=167 cm$^3$/g;"

Signed and Sealed this

Third Day of June, 1997

*Attest:*

BRUCE LEHMAN

*Attesting Officer*    Commissioner of Patents and Trademarks